United States Patent
Gage et al.

(10) Patent No.: US 11,321,078 B2
(45) Date of Patent: May 3, 2022

(54) CONTINUOUS IN-PLACE SOFTWARE UPDATES WITH FAULT ISOLATION AND RESILIENCY

(71) Applicants: John Gage, Weare, NH (US); Alain Slak, Bedford, MA (US); David M. T. Ting, Sudbury, MA (US); Sean Ting, San Francisco, CA (US)

(72) Inventors: John Gage, Weare, NH (US); Alain Slak, Bedford, MA (US); David M. T. Ting, Sudbury, MA (US); Sean Ting, San Francisco, CA (US)

(73) Assignee: TAUSIGHT, INC., Sudbury, MA (US)

( * ) Notice: Subject to any disclaimer, the term of this patent is extended or adjusted under 35 U.S.C. 154(b) by 0 days.

(21) Appl. No.: 17/137,782

(22) Filed: Dec. 30, 2020

(65) Prior Publication Data

US 2021/0200533 A1 Jul. 1, 2021

Related U.S. Application Data

(60) Provisional application No. 62/954,763, filed on Dec. 30, 2019.

(51) Int. Cl.
| | |
|---|---|
| *G06F 8/656* | (2018.01) |
| *G06F 8/65* | (2018.01) |
| *G06F 8/71* | (2018.01) |
| *G06F 9/50* | (2006.01) |

(52) U.S. Cl.
CPC ............ *G06F 8/656* (2018.02); *G06F 8/66* (2013.01); *G06F 8/71* (2013.01); *G06F 9/5038* (2013.01)

(58) Field of Classification Search
CPC ............ G06F 8/656; G06F 8/66; G06F 8/71; G06F 9/5038
See application file for complete search history.

(56) References Cited

U.S. PATENT DOCUMENTS

| | | | | |
|---|---|---|---|---|
| 6,594,735 | B1 * | 7/2003 | Baker | ............... G06F 8/656 711/147 |
| 10,652,154 | B1 * | 5/2020 | Matthews | ............ H04L 47/125 |
| 2002/0188740 | A1 * | 12/2002 | Tang | ................ H04L 67/1002 709/230 |
| 2005/0163107 | A1 * | 7/2005 | Gunturi | ................ H04L 45/56 370/352 |
| 2008/0240039 | A1 * | 10/2008 | Parekh | ................ H04W 36/02 370/331 |
| 2013/0124193 | A1 * | 5/2013 | Holmberg | ............ G06F 40/237 704/9 |
| 2020/0174866 | A1 * | 6/2020 | Ayyapureddi | .... H01L 27/11206 |

\* cited by examiner

*Primary Examiner* — Phillip H Nguyen
(74) *Attorney, Agent, or Firm* — Morgan, Lewis & Bockius

(57) ABSTRACT

Methods and systems facilitate continuous processing of incoming data while one or more software components are updated and/or are temporarily unavailable. Computing tasks may be divided into idempotent steps with the computational state exchanged between steps saved in a persistent manner. In various embodiments, these steps are assembled into one or more computation pipelines.

26 Claims, 1 Drawing Sheet

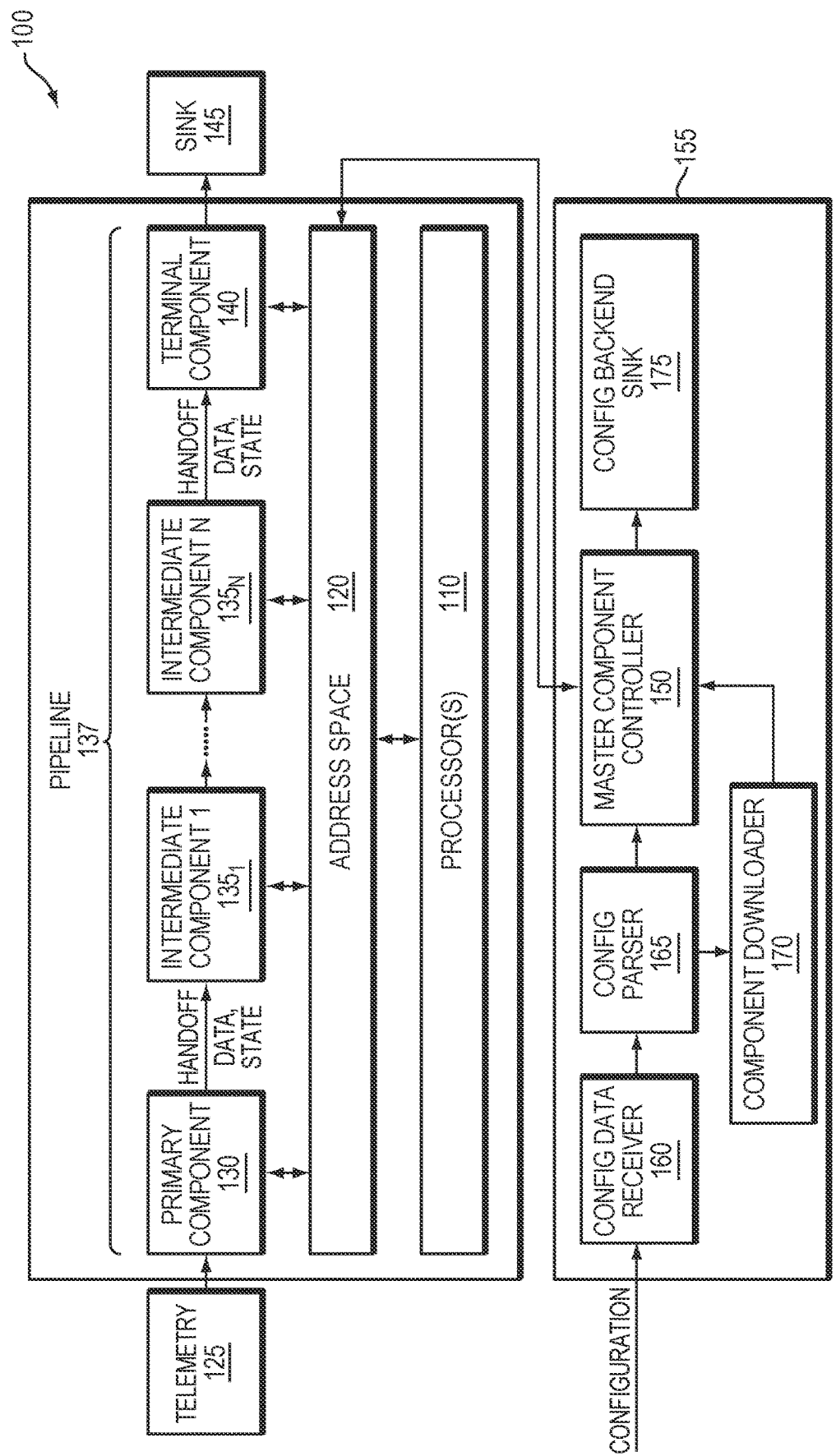

CONTINUOUS IN-PLACE SOFTWARE UPDATES WITH FAULT ISOLATION AND RESILIENCY

RELATED APPLICATION

This application claims the benefit of and priority to U.S. Provisional Application No. 62/954,763, filed on Dec. 30, 2019, the entire disclosure of which is hereby incorporated herein by reference.

TECHNICAL FIELD

In various embodiments, the present invention relates generally to securely updating software in distributed, heterogeneous computational environments.

BACKGROUND

Normally for a software application to be updated, or for a fault to be repaired, the program is terminated, the new code is installed, and the software application is finally restarted. This workflow is disruptive, and in critical-care settings, risks interruptions in care delivery. In other mission-critical environments, the loss of processing efficiency and operational interruption may not threaten life and health but may nonetheless impose significant inconvenience and possible data loss when data enters the application from an independent and uninterruptible source. The lost information may be irreplaceable, creating unacceptable gaps for continuous-monitoring applications such as those involving auditing or security.

Accordingly, there is a need for non-disruptive approaches to updating software across an enterprise having heterogeneous hardware and software components—approaches that avoid interruption of running applications without comprising security or introducing system-level faults.

SUMMARY

Embodiments of the present invention involve methods and systems for uninterrupted processing of incoming data while one or more software components are updated. Computing tasks may be divided into idempotent steps with the computational state exchanged between steps saved in a persistent manner. In various embodiments, these steps are assembled into computation pipelines.

As used herein, the term "application" means any running process on a computational device, and in a medical setting can include healthcare information (e.g., EMR) and workflow (e.g., CPOE) systems as well as conventional software such as word processors, spreadsheets, and browsers.

In one aspect, the invention pertains to a computational system configured to support uninterrupted processing of incoming data notwithstanding temporary unavailability of one or more software components. In various embodiments, the system comprises a processor; a computer memory including an address space comprising a bounded range of valid available addresses; and a plurality of computational modules executable by the processor. The modules are arranged in at least one ordered, sequential computation pipeline and cooperate to process the incoming data. The modules include a primary component for receiving or generating data, at least one intermediate component for processing data received from a preceding component, and a terminal component for receiving data from a final intermediate component and sending outgoing data to a data sink. Each of the components except the terminal component is configured to communicate, to at least one subsequent pipeline component via the address space, where a handoff comprises state information of the component producing the handoff and data for processing by at least one subsequent component. The handoffs are persistent in memory so that processing can resume following an interruption without loss of data or state along the pipeline(s).

In various embodiments, each component performs a single idempotent step of a computing task. The primary component may be configured to receive data from a continuous source and transfer the received data, without processing, into a handoff stored in the address space. The handoffs may be persistently stored as memory-mapped files.

In some embodiments, at least some of the components receive input from more than one handoff and at least some of the components provide output to more than one handoff. Each component may be configured to cause removal of the state in the handoff received by that component following completion of a task. Each component may be configured to remove data from the handoff received by that component as it performs a task.

In various embodiments, the plurality of computational modules cooperate to detect a computational threat and cause a computational action to be taken to mitigate the threat. The system may include a master component controller configured to coordinate updates to the pipeline components without loss of data or state by (a) pausing incoming data or (b) allowing data to continue to enter an incoming handoff of a pipeline component to be updated, causing the update to be installed and the updated pipeline component to be re-initialized; in this way, the re-initialized updated pipeline component reads its starting state and data from the incoming handoff and no incoming data is lost.

In some embodiments, the master component controller is configured to coordinate replacement of a pipeline component without loss of data or state by (a) pausing incoming data or (b) allowing data to continue to enter an incoming handoff of the pipeline component to be updated, causing initialization of a replacement pipeline component; in this way, the replacement pipeline component and the pipeline component to be replaced simultaneously read the same handoff, and the pipeline component to be replaced may be stopped and unloaded such that no incoming data is lost.

The master component controller may be configured to assemble the pipeline by (i) parsing a pipeline configuration, (ii) organizing components of the pipeline configuration into a dataflow engine to process incoming via intermediate and terminal components, loading the components into memory, and, via memory allocation, connecting handoffs among the components. The master component controller may be configured to instantiate redundant versions of pipeline components to enhance pipeline throughput.

In another aspect, the invention pertains to a computational system configured to support uninterrupted processing of incoming data notwithstanding temporary unavailability of one or more software components. In various embodiments, the system comprises a processor; a computer memory including an address space comprising a bounded range of valid available addresses; and a plurality of computational modules executable by the processor. The modules include or consist of a primary component for receiving or generating data and a terminal component for receiving data from the primary component and sending outgoing data to a data sink. The primary component is configured to communicate, to the terminal component via the address space, a handoff comprising state information for processing by the terminal component. The handoffs are persistent in memory so that processing can resume following an interruption without loss of data or state along the pipeline(s).

Still another aspect of the invention relates to a computational method supporting uninterrupted processing of incoming data notwithstanding temporary unavailability of one or more software components. In various embodiments, the method comprises the steps of allocating, in a computer memory, an address space comprising a bounded range of valid available addresses; and computationally executing a plurality modules arranged in at least one ordered, sequential computation pipeline and cooperating to process the incoming data. The modules include a primary component for receiving or generating data, at least one intermediate component for processing data received from a preceding component, and a terminal component for receiving data from a final intermediate component and sending outgoing data to a data sink. Each of the components except the terminal component is configured to communicate, to at least one subsequent component in the pipeline sequence via the address space, a handoff comprising state information of the component producing the handoff and data for processing by at least one subsequent pipeline component. The handoffs are persistent in memory so that processing can resume following an interruption without loss of data or state along the pipeline(s).

In various embodiments, each component performs a single idempotent step of a computing task. The primary component may be configured to receive data from a continuous source and transfer the received data, without processing, into a handoff stored in the address space. The handoffs may be persistently stored as memory-mapped files. At least some of the components may receive input from more than one handoff and at least some of the components may provide output to more than one handoff.

In some embodiments, at least some of the components receive input from more than one handoff and at least some of the components provide output to more than one handoff. Each component may be configured to cause removal of the state in the handoff received by that component following completion of a task. Each component may be configured to remove data from the handoff received by that component as it performs a task.

In various embodiments, the plurality of computational modules cooperate to detect a computational threat and cause a computational action to be taken to mitigate the threat. Updates to the pipeline components may be coordinated without loss of data or state by (a) pausing incoming data or (b) allowing data to continue to enter an incoming handoff of a pipeline component to be updated, causing the update to be installed and the updated pipeline component to be re-initialized; in this way, the re-initialized updated pipeline component reads its starting state and data from the incoming handoff and no incoming data is lost.

In some embodiments, replacement of a pipeline component is coordinated without loss of data or state by (a) pausing incoming data or (b) allowing data to continue to enter an incoming handoff of the pipeline component to be updated, causing initialization of a replacement pipeline component; in this way, the replacement pipeline component and the pipeline component to be replaced simultaneously read the same handoff, and the pipeline component to be replaced may be stopped and unloaded such that no incoming data is lost.

In various embodiments, the method further comprises the steps of assembling the pipeline by (i) parsing a pipeline configuration, (ii) organizing components of the pipeline configuration into a dataflow engine to process incoming via intermediate and terminal components, loading the components into memory, and, via memory allocation, connecting handoffs among the components. In addition, the method may further comprise the step of instantiating redundant versions of pipeline components to enhance pipeline throughput.

In yet another aspect, the invention relates a computational method supporting uninterrupted processing of incoming data notwithstanding temporary unavailability of one or more software components. In various embodiments, the method comprises the steps of allocating, in a computer memory, an address space comprising a bounded range of valid available addresses; and computationally executing at least one pipeline comprising or consisting of a pair of computational modules. The modules comprise or consist of a primary component for receiving or generating data and a terminal component for receiving data from a the primary component and sending outgoing data to a data sink. The primary component is configured to communicate, to the terminal component via the address space, a handoff comprising state information for processing by the terminal component. The handoffs are persistent in memory so that processing can resume following an interruption without loss of data or state along the at least one pipeline.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWING

The foregoing discussion will be understood more readily from the following detailed description of the disclosed technology, when taken in conjunction with the single FIGURE of the drawing, which schematically illustrates a representative architecture implementing certain embodiments of the invention.

DETAILED DESCRIPTION

1. Overview a. Pipelines, Components, and Task State Persistence

The present disclosure may be understood with reference to FIG. 1, which shows the primary computational components of a system 100 implementing embodiments of the invention. The system 100 includes, in broad overview, one or more general-purpose processors 110 and a computer memory including a bounded address space 120.

In order to support uninterrupted processing of incoming data while one or more software components are updated, computing tasks are divided into idempotent steps with the computational state exchanged between steps saved in a persistent manner. In various embodiments, these steps are assembled into computation pipelines.

Pipelines are constructed with one or more components (each component corresponding to one processing step) in an ordered sequence (represented, e.g., as a directed graph). More specifically, components are executable elements that each perform a single idempotent unit of work. A "handoff" connects one component with another for dataflow purposes. It is possible for any component in a pipeline to receive input from n handoffs and to provide output to m handoffs, where n and m can be arbitrary numbers greater than or equal to 0. The upper bound of n or m is determined by need and the amount of available resources. As each component completes its task, it places its newly created state into its outgoing handoff. The next component receives and reads the state from this handoff and performs its own task, i.e., the next task in the pipeline sequence. Each subsequent component in the pipeline acts in the same fashion until the terminal component is reached. The terminal component may not have an outgoing handoff (its output is typically a data sink), but it may be used to effect an external event such as sending data to a server. Should any of the components in a pipeline fail to start, continue, or complete its task, the state in its incoming handoff will remain in the handoff; and if the component does ultimately complete its task, the state representing that task in the incoming handoff is removed.

Handoffs are message queues with a persistent backing store (e.g., memory-mapped files) that serve as go-betweens, holding the output data from one component; that data is the input data for the next component. Typically, "primary" components are those components that receive data from an external source (or self-generated data) rather than from a handoff. Primary telemetry sources are external providers of telemetry that are message-based and include, for example, Event Tracing for WINDOWS (ETW), WINDOWS Management Instrumentation (WMI), and callback functions invoked by other subsystems capable of generating event data. A callback, for example, may be used to intercept file access events or a hardware-generated event such as insertion of a USB device or connection to a bluetooth device. "Intermediate" components have both an incoming handoff and an outgoing handoff. They receive input data from one component and pass it on to another. "Terminal" components have an incoming handoff but their outgoing handoff is replaced by a backend sink. An example of this is MQTT (a messaging protocol for small sensors and mobile devices) code that sends data to a backend.

Thus, as shown in FIG. 1, a telemetry source 125 provides data to the primary component 130, which hands off to a first intermediate component 1 (indicated at $135_1$). The pipeline 137 includes additional intermediate components 2 (not shown) through N (indicated at $135_N$). The final intermediate component N hands data and state off to a terminal component 140, which, after completing processing of the incoming handoff, sends its own handoff to a data sink 145, which may be a data-storage or archival device, or a backend server that may include one or more such devices. The transactional nature of handoffs may be understood from the following example. Consider two components, A and B, such that A precedes B in the pipeline 137 sequence and A's unit of work produces data that B uses to accomplish its unit of work; for example, A may be the primary component 130 and B may be the first intermediate component $135_1$, or A and B may be successive intermediate components. In operation:

1. Component A places its data in the handoff once it successfully completes its unit of work.
2. Component B then reads the data in the handoff but does not remove it.
3. Component B then attempts its unit of work.
4. If component B finishes its work successfully, it removes the data from the handoff.

If component B fails completely and must be restarted, or, indeed, if the entire system 100 fails and must be restarted, component B begins by reading its handoff and attempts to redo its unit of work. If component B completes its unit of work successfully and removes the data from the handoff, any restart will cause component B to read the next set of data. Accordingly, the handoff data represents serialized tasks. Failure of any component provides fault isolation such that any given intermediate or terminal component can fail and then recover. Because each component (other than the terminal component 140) corresponds to an idempotent task, even if it were to be run many times, the result would be the same. This is significant because failure (for whatever reason at whatever point) may cause the component to execute its unit of work more than once. The terminal component 140 may not be idempotent as it may redo some processing and output a duplicate event. Duplicate events are trapped and eliminated by the sink 145. In alternative embodiments, the idempotency requiredment can be relaxed by guaranteeing (as in APACHE BEAM) that any given component will only generate one output that is visible externally no matter how many times it is run on a given task.

In a typical deployment, as illustrated in FIG. 1, the telemetry source 125 feeds the pipeline 137 so that an ingested event—e.g., a USB device insertion—causes that event to start the data flow that analyzes the event and ultimately produces some type(s) of output, e.g., an audit notice or, in the case of a detected attack, a blocking action. If the event is initiated by a running application outside the pipeline 137, the modules used by the application, the access controls placed on each module, the privileges of the user running the application, the resources used by the process, and any other relevant management information may be packaged into a telemetry stream that is sent to the pipeline 137.

As noted, the output from one component becomes the input for the next and so on as long as all components 135 can "see" the same address space 120, i.e., a bounded range of valid available addresses in computer memory. In some embodiments, the components 135 have access to the address space 120, and in other embodiments, the components 135 both have access to and execute within the address space 120. It should be understood, however, that handoffs allow components to span thread, process and CPU boundaries as long as they can access the same file. No memory addresses are exchanged, so components can operate in their own address spaces, not necessarily within the same address space as other components. Any data structure can be used as long as it is persistent on demand and can be shared across process boundaries.

Consider, for example, a component responsible for monitoring file operations. It is initialized when an external application opens a file: the "file open" event is handled by a primary component 130 and saved in the address space 120 as a handoff for subsequent processing. The next component tracks the state of the file as the application uses it, keeping statistics on the number of reads and writes, as well as samples of the data exchanged. A classifier component can be used to identify the data. A terminal component 140 may be called when a "file close" operation is called to publish the usage statistics on the file.

In various embodiments, the pipeline framework and its constituents are architected to support the following principles. The principle of Continuous Ingress states that the pipeline must endeavor to allow all telemetry sources to enter the pipeline. Stated differently, all incoming telemetry data should arrive at the primary component's outgoing handoff. The principle of Lossless Pause states that any pipeline or pipeline component can be paused (for instance, to install a replacement for a component) without losing any telemetry source data, and in some embodiments, without loss of state. The principle of Pipeline Throughput Normalization states that in any given pipeline, the throughput of each component can be adjusted (if the component so allows) to attempt to keep the throughput of the components roughly equal. The principle of Component Fault Protection states that there is a fault boundary around a component that will allow the pipeline to continue functioning in the event of a software or hardware fault in a component. This may require that the component be reloaded or restarted, but because of the principle of Lossless Pause, data loss does not occur. In particular, the fault-protection barrier protects propagation of a software fault (such as a C++ exception) or a hardware fault (e.g., a bad memory read or write) from leaving the context of the thread(s) on which the associated component is executing. Discovery of a fault may cause the component to be reloaded or restarted; the data read by the component may be isolated and archived; and/or in unusual circumstances, the entire service may be restarted.

Bottlenecks can be detected by a pipeline based, for example, on an increase in the number of records (serialized tasks) to be processed in a handoff. When this condition is detected, more of the components using the handoff (as an incoming handoff) can be instantiated, thereby increasing throughput.

b. The Primary Component

The exception to this pattern, in various embodiments, is the primary component 130, i.e., the component at the beginning of a pipeline. This component will either generate its own data (to be placed in its outgoing handoff) or receive it from an external source outside the pipeline. In the latter case, the data may come from a persistent input stream, e.g., an uninterruptible source that cannot be paused. This issue is unique to incoming data and is internally mitigated in the lossless pause model described below. Overall resiliency (i.e., the ability to absorb the impact of a problem in one or more pipeline steps while continuing to provide an acceptable service level) can be preserved if primary components are designed to do nothing more than send the incoming data directly to the outgoing handoff. This reduces the window of opportunity for an incoming telemetry event to be lost due to loss of power or failure in a process component. Typically, the role of the primary component 130 is to record the event into the handoff and allow subsequent components to work in sequence (without real-time restriction) and to negotiate event delivery where applicable, e.g., handling http/mqtt connections.

c. Lossless Pause and Software Update

A "Master Component Controller" (MCC) 150, a module executed by the processor(s) 110 and residing in computer memory 155, is reactive to conditions found in the pipelines and coordinates the updating of components in the pipelines. The persistence of state described above allows any component to be stopped or paused indefinitely without the potential for data loss. This is because the incoming state can accumulate in the persistent handoff, and as a result, when the component is restarted, it can resume processing. Since components can be paused or shut down, their constituent software modules can be replaced or duplicated by a parallel component running in a shadow mode, ready to take over the processing, if the goal is to minimize down time. Repair of one or more pipeline components can be accomplished without loss of data, as illustrated by the following representative sequence:

1. A component (the "subject component") reads its starting state from its incoming handoff.
2. The subject component begins to process the starting state in order to produce an end result, which will enter into its outgoing handoff
3. A software update in the form of a new component module becomes available for the subject component.
4. The MCC 150 is made aware of this by means of a message in its incoming handoff notifying the MCC of the availability of updates to one or more components.
5. The running subject component is stopped and unloaded by the MCC 150. There is no need for the running subject component to finish its current task before doing this, as the component can be restarted to reprocess the last handoff on which it was operating.
6. Potentially, additional data continues to enter the incoming handoff of the subject component from a previous component and is stored there while the subject component is restarted or repaired.
7. The MCC 150 loads the new software into memory, ready to start processing when enabled by the MCC.
8. The revised subject component starts at step 1 above.

If the component to be updated is a primary component and the incoming data cannot be paused, the MCC may start a second instance of the primary component (using the updated code) and, as soon as it is running, stop and unload the original.

d. Handling System Faults

Even the best software can and will produce faults. Faults are occurrences of code failure that cause the software to perform in an abnormal manner such that the current thread is interrupted by an exception. Because of the pipeline features described above, the component contributing the fault can be stopped and restarted or repaired without losing any data since the data will be stored in the component's handoff. More importantly, the failure of a component does not cascade into a failure of the entire program. Isolation to computational blocks allows for isolation and correction at a functional level, simplifying the development of resilient software systems.

The following is a representative example of how the pipeline 137 mitigates this problem:

1. A subject component reads its starting state from its incoming handoff.
2. The subject component begins to process the starting state in order to produce an end result, which will enter its outgoing handoff.
3. The subject component encounters a fault prior to producing the desired result.
4. The fault is trapped by an exception, which is caught outside the processing step. All exceptions in components are handled ultimately in the MCC 150.
5. Since the subject component does not finish its step, the starting state remains in the incoming handoff.
6. The subject component can be stopped, cleared of its bad state and restarted, or alternatively, a repaired component can be loaded and started.
7. Potentially, additional data continues to enter the incoming handoff of the subject component from a previous component and is stored there while the subject component is restarted or repaired.

8. Once the subject component is restarted, it returns to step 1. In order to avoid an endless loop of failures leading to restarts, the MCC 150 tracks this condition and may either revert to an older component or may purge the handoff and capture it for out-of-band inspection and processing, thereby preventing loss of audit data.

2. The Master Component Controller

The MCC 150 assesses the viability of running components and updates components while the system as a whole is running, although affected components are stopped during their updates. In particular, the MCC 150 parses a configuration published by a server and organizes the components of a pipeline 137 into a dataflow engine to process data generated at the primary component(s) via intermediate and terminal components. The MCC 150 takes the configuration and loads the appropriate components into memory, and connects the handoffs (i.e., memory holding task descriptions and data) between the output of one component and the input of one or more others. Accordingly, a primary component receiving an event generates a message that it places in the appropriate handoff(s); the message can be distributed as a unit of work to multiple downstream components where each component executes independently and can generate output handoffs for subsequent components—that is, handoffs need not follow a single linear sequence as illustrated in FIG. 1. In a situation where a new configuration is received (e.g., due to a subscription event), the MCC 150 takes the new configuration and selectively changes one or more components as well as handoffs so that no in-flight data is lost. Updated components are then loaded and reconfigured into the new data flow or, more typically, the MCC 150 replaces the older components while retaining the same dataflow connections. If the handoff format has changed, all old handoff data is processed before the new components are connected. Typically, the incoming (previous) component(s) are stopped so that no data flows into the handoff. The component being replaced is allowed to consume the contents of its incoming handoff in order to empty its contents.

The MCC 150 may reside in a pipeline comprising or consisting of a Config Data Receiver 160 (a primary component), a Config Parser 165 (an intermediate component), the Component Downloader 170 (another intermediate component), the MCC 150 (an intermediate component), and the Config Backend Sink 175 (a terminal component). The process of assembling a new pipeline starts with a new configuration message received from a backend server. Specifically, the Config Data Receiver 160 receives this message from its configuration update source. This component's function is to receive the message and place it into the outgoing handoff. The Config Data Receiver 160 is the subscription callback for the configuration topic specified in the MQTT software.

Next in line is the Config Parser 165, which parses the configuration message and places a series of serialized tasks in its outgoing handoff. For example, suppose component A specified in the configuration message has a new version number (i.e., needs an upgrade). The Config Parser 165 determines if the component is to be installed immediately and, if so, generates instructions to the Component Downloader 170 to download the component. In one representative implementation, all of the changes are computed and placed in one task that is passed to the Component Downloader 170. The Component Downloader 170 then processes all of the downloads necessary as part of one task. This avoids the need to synchronize various Component Downloader components in order to determine when all of the downloads for an update are complete. When connecting to the download source server via one or more URLs, the Component Downloader 170 may verify the server's certificate to ensure that the server is legitimate. If there is more than one component to download, multiple instructions are sent, causing the MCC 150 to create another instance of the component downloader component. The Config Parser 165 also generates instructions to replace component A and these are passed to the MCC 150 by the Component Downloader 170 after the downloads are complete.

The MCC 150 is responsible for updating components (including itself) and managing the life cycle of components. The MCC 150 can stop, unload, load and restart any component of any pipeline with which it is associated. It also receives feedback from each individual component (and handoffs) with regard to the size of the queue (i.e., the as-yet unperformed tasks in any incoming handoff), task execution times, and other internal data. This data is used to reduce bottlenecks (by throttling instances of components) and detect blocked pipelines (which may be resolved by restarting components). The update tasks performed by the MCC 150 include:

Stop components
Unload components
Load components
Start components
Restart execution of components
Service restart
Create instances of components (to satisfy load and normalize throughput)

Stopping a component causes it to stop reading its incoming handoff. The component remains loaded but does not execute. In most cases, this is in preparation for an unload operation. The component will finish its current task and do no more.

Unloading components is done by deleting the module (typically a dynamic library on WINDOWS or shared object on LINUX) from memory. Since this invalidates all running code code in the component, the component is stopped prior to this operation. If there are any other pipelines that share this component, they will also be stopped. The MCC 150 may not attempt to normalize the throughput of a pipeline containing a stopped component. Typically, each component has only one dynamic library that supports it and each dynamic library supports only one component; however, there may be multiple instances of the same component in memory and in use, all operating, in a single pipeline, from the same handoff. (There may also be instances in parallel pipelines that operate off different handoffs.)

Component replacement is performed by placing the files downloaded by the Component Downloader 170 in active service at their final destination(s). This step registers them as being inactive and associates them with all the active pipelines in which they participate. As a result, in the unloading step, the MCC 150 "knows" what pipelines to stop when unloading the library supporting the component.

Component loading causes the file(s) placed into service to be loaded into memory and function pointers to be reinitialized for the newly updated component, at which point the component is ready to run. When components are loaded, the signatures of the associated dynamic link libraries (DLLs) are checked to ensure integrity of the modules. Components can also be packaged in an encrypted format and decrypted by the MCC 150 when it loads them in memory.

The "start components" step is just a call by the "start" method of the MCC 150 through the newly established function pointer in the load step. This initializes the component, causing it to examine its incoming handoff to see if it has some work to do.

Restarting component execution causes a stop and then a start. This step is typically used to refresh component state in the event of a fault or as an attempt to improve throughput through stalled or poorly performing pipelines. Reloading components is a more intensive version of restarting components. It involves a stop, unload, load, and a start.

Service restarts are initiated when process-memory corruption is detected. While the process that hosts the components will continue performing any tasks that have been detected but have not yet been completed at the time of the service restart, no incoming tasks will be queued while the service is restarted as primary components will be offline during this time.

3. Updates

In the event that the MCC 150 is called upon to replace itself, the following representative sequence of steps occurs:

1. A second instance of the MCC is loaded into memory and started using the replacement code.
2. This instance is used to stop and unload the current MCC as described above.
3. The second, now-running MCC instance replaces the first.

In the event that a primary component is to be updated, it would generally be unacceptable to temporarily stop the processing of incoming data from a telemetry data source. Primary components may be designed so that multiple instances can be instantiated and simultaneously process the same telemetry data. During an update, the MCC 150 takes advantage of this by instantiating a second instance of the primary component and, after it is started and coupled to its outgoing handoff, the MCC 150 stops the old primary component.

The MCC 150 may create additional instances of components in order to normalize pipeline throughput. Each component (and handoff) may provide an element of telemetry to the MCC 150 to regulate this action. This element indicates the total time from the insertion of the task in the queue to its execution completion. The MCC 150 may keep a running average of this value. If the value increases by n standard deviations (with n being settable in configuration), the MCC 150 may create another instance of the component (if it is configured to allow it) to increase pipeline throughput. Additional components may be created for execution by different processor cores to add in parallelism. This process may be repeated at each incremental rise (in n standard deviations) up to a configured limit (based on, e.g., the number of components in parallel, the number of available cores, or a percentage of the available memory on the system).

4. Failure Management

Once serialized task data makes its way to a handoff, it is generally safe to retry an attempt if the subsequent component cannot or fails to operate on the data. Even after a complete system failure, persisted handoff data can be reread and attempted again. However, if data never makes it to the first handoff, it can be lost. To mitigate this, code between the primary telemetry source 125 and the handoff may be as thin as possible. Moreover, some telemetry sources have the ability to store information until it is requested. Event Tracing for Windows (ETW) and WMI have this capability using a pull model (as long as the WMI subscription is not terminated).

Non-primary components read a serialized task from a handoff, attempt to process it, and then read the next serialized task from the handoff. If the data read results in repeated failures, the data could be the proximate cause. Detection by the MCC 150 of repeated attempts to process the same serialized task can prompt isolation of the data in an unprocessed state and sending the unprocessed data to the backend sink 145 for further-investigation.

In the event that any given pipelined process becomes disconnected from the backend sink 145 in such a manner that it is not likely to be reconnected soon, terminal components on other machines can be used to process the data. In the event that the MCC 150 detects a failure in a component, or set of components, the pipelined process may have the capability to roll back to a known operative state. In order to facilitate this, the process may store one or more previous known operative configuration specifications along with the associated components.

Certain telemetry elements may be obtained within the boundaries of other processes on the system. In these cases, the telemetry collected may be forwarded to a pipeline using ETW. In these pipelines, ETW will be the telemetry data source in the primary component.

5. Agents

As described in U.S. Ser. No. 16/286,962, entitled "Resilient Management of Resource Utilization" and filed on Feb. 27, 2019 (the entire disclosure of which is hereby incorporated by reference), "agents" can be deployed as running processes on potentially vulnerable devices (e.g., endpoint devices in an institutional setting such as a hospital) to monitor device usage and take action when a potentially dangerous event (e.g., insertion of a USB device) is detected. As described in the '962 application, an agent may include one or more sensors, actuators, and intelligent controllers. Sensors monitor and analyze computational activity to detect potential anomalous behavior. The intelligent controller receives data from the sensors and analyzes these, generally on successive time windows of sensor data, by comparison against a model for acceptable or unacceptable resource use or behavior. The "reflexive" action taken by the controller in the event of a detected threat is biased toward being defensive to limit the potential for harm to the endpoint rather than the overall infrastructure.

To monitor behavior associated with applications (as opposed to I/O or other hardware-level events), the agent may run as an embedded thread of the application to be monitored (within the same address space), maintaining visibility to the set of statically and dynamically loaded library modules, as well as all system resources, used by the application. The agent, in real time, is aware of the files that are opened, the privileges asserted, the registry keys and configuration files accessed, attached devices used and network services requested. As application requests are made for each resource, the agent dynamically builds a tree representing the dependent system components, adding more details as the application continues to run and request additional resources.

Agents may be implemented in the pipelined fashion described above. If configured as set forth in the '962 application, the agent may receive telemetry via a sensor module, which may serve as the primary component in a pipeline. Intermediate components may be program modules configured to react to specific events (e.g., actuators and intelligent controllers) specified in the telemetry ingested by the sensor; that is, the sensor may monitor—i.e., receive as telemetry—specific hardware and application-level events, passing these through the pipeline where they encounter specialized intermediate pipeline components that react to particular events. These intermediate components may be updated as threat levels or institutional policies change. Moreover, more than one agent may share a particular intermediate component, since its functionality may be broadly applicable across multiple agents deployed in an endpoint device or server.

The pipeline organization described above enables agent components to be updated without sacrificing agent function for any period of time or ignoring incoming telemetry data indicative of a threat, since data may be accumulated during component update or repair and subsequently analyzed. This contrasts with more rigid systems in which conditions are temporarily not monitored or, to avoid risk, the entire system is shut down during an update.

As described above, the Config Data Receiver 160 may receive an agent specification that is analyzed by the Config Parser 165, following which the MCC 150 creates a pipelined instance 137 of the specified agent. Updates to an operative agent may be sent via configuration messages. Configuration is pushed to existing agents each time they connect to the MQTT broker and whenever a new configuration is published to the update server. Agents may send state messages to the update (or other management) server whenever there is a change in the running status.

An exemplary format for the complete agent state as well as a single component (primary or intermediate) is as follows:

```
message AgentState {
   string hostname = 1;
   string agent_ID = 2;
   google.protobuf.Timestamp timestamp = 3;
   bool good = 4;
   enum Status {
      ENABLED = 0;
      DISABLED = 1;
      UNINSTALLED = 2;
   }
   Status status = 5;
   AgentComponent master_controller = 6;
   AgentComponent parser = 7;
   repeated AgentComponent components = 8;
}
message AgentComponent {
   string id = 1;
   string name = 2;
   string version = 3;
   string bucket_uri = 4; // GCS URI for running component
   map<string, string> settings = 5; // Component configuration
   // IDs for all components that directly consume data from this
   component repeated string dependents = 6;
}
```

The first five fields of the message capture high-level agent information. The AgentState.hostname and AgentState.agent_ID fields identify the agent and device on which it operates, the AgentState.timestamp captures message-generation time, and the AgentState.good is a flag set by the agent when reporting on the validity of its running status. Lastly, the AgentState.status is sent by the server as config to indicate when an agent should pause operations or uninstall itself.

The bulk of the AgentState message describes the various components, their version and settings, and their topology. The MCC 150 and Config Parser 165 are identified uniquely in the AgentState message via the AgentState.master_controller and AgentState.parser fields. The rest of the component graph is defined in AgentState.components, which lists the rest of the components in an arbitrary order.

An AgentComponent message gives the name and version for the component, a unique ID in case the component graph contains distinct instances of the same component, and the URI for the GCS object containing the component. Component configuration may be passed in a key-value map containing strings. Finally, identifiers of all immediately downstream components are given in the AgentComponent.dependents fields.

Configuration represents the full desired running state for an agent, as described in the AgentState Message section. The server responsible for agent updates pushes new configuration down to agents through the agent's device config topic. Published configurations may be sent to agents with an open connection as they are received and may be removed upon acknowledgment. If an agent is disconnected when the configuration is published, it will receive the message on connection.

State represents the current running status of an agent. Whenever this changes, the agent publishes its new state to the agent server as an AgentState message. AgentState messages are parsed and processed by the server in a similar manner to telemetry events with the end goal of forming a complete operational audit trail of the agent.

In general, the endpoint or other device on which an agent is deployed may include a processing unit, a system memory, and a system bus that couples various system components including the system memory to the processing unit. Computers typically include a variety of computer-readable media that can form part of the system memory and be read by the processing unit. By way of example, and not limitation, computer-readable media may comprise computer storage media and communication media. The memory of the endpoint device as well as that of the system 100 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the OS/2 operating system, the BeOS operating system, the MACINTOSH operating system, an OPENSTEP operating system or another operating system of platform.

Any suitable programming language may be used to implement without undue experimentation the process functions described above in connection with the system 100. Illustratively, the programming language used may include assembly language, Ada, APL, Basic, C, C++, C*, FORTRAN, Java, Modula-2, Pascal, Prolog, Python, REXX, and/or JavaScript, for example. Further, it is not necessary that a single type of instruction or programming language be utilized in conjunction with the operation of the system and method of the invention. Rather, any number of different programming languages may be utilized as is necessary or desirable.

The computing environment of the system 100 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processor(s) 110 may be a general-purpose processor, but may utilize any of a wide variety of other technologies including special-purpose hardware, a microcomputer, minicomputer, mainframe computer, programmed microprocessor, microcontroller, peripheral integrated-circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices capable of implementing the steps of the processes of the invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A computational system configured to support uninterrupted processing of incoming data notwithstanding temporary unavailability of one or more software components, the system comprising:
   a. a processor;
   b. a computer memory including an address space comprising a bounded range of valid available addresses; and
   c. a plurality of computational modules executable by the processor, the modules being arranged in at least one ordered, sequential computation pipeline and cooperating to process the incoming data, the modules including a primary component for receiving or generating data, at least one intermediate component for processing data received from a preceding component, and a terminal component for receiving data from a final intermediate component and sending outgoing data to a data sink, wherein each of the components except the terminal component is configured to communicate, to at least one subsequent pipeline component via the address space, a handoff comprising state information of the component producing the handoff and data for processing by at least one subsequent component, the handoffs being persistent in memory so that processing can resume following an interruption without loss of data or state along the at least one pipeline.

2. The system of claim 1, wherein each component performs a single idempotent step of a computing task.

3. The system of claim 1, wherein the primary component is configured to receive data from a continuous source and transfer the received data, without processing, into a handoff stored in the address space.

4. The system of claim 1, wherein handoffs are persistently stored as memory-mapped files.

5. The system of claim 1, wherein at least some of the components receive input from more than one handoff and at least some of the components provide output to more than one handoff.

6. The system of claim 1, wherein each component is configured to cause removal of the state in the handoff received by that component following completion of a task.

7. The system of claim 1, wherein each component is configured to remove data from the handoff received by that component as it performs a task.

8. The system of claim 1, wherein the plurality of computational modules cooperate to detect a computational threat and cause a computational action to be taken to mitigate the threat.

9. The system of claim 1, further comprising a master component controller configured to coordinate updates to the pipeline components without loss of data or state by (a) pausing incoming data or (b) allowing data to continue to enter an incoming handoff of a pipeline component to be updated, causing the update to be installed and the updated pipeline component to be re-initialized, whereby the re-initialized updated pipeline component reads its starting state and data from the incoming handoff and no incoming data is lost.

10. The system of claim 1, further comprising a master component controller configured to coordinate replacement of a pipeline component without loss of data or state by (a) pausing incoming data or (b) allowing data to continue to enter an incoming handoff of the pipeline component to be updated, causing initialization of a replacement pipeline component whereby the replacement pipeline component and the pipeline component to be replaced simultaneously read the same handoff, and stopping and unloading the pipeline component to be replaced whereby no incoming data is lost.

11. The system of claim 1, further comprising a master component controller configured to assemble the pipeline by (i) parsing a pipeline configuration, (ii) organizing components of the pipeline configuration into a dataflow engine to process incoming via intermediate and terminal components, loading the components into memory, and, via memory allocation, connecting handoffs among the components.

12. The system of claim 11, wherein the master component controller is further configured to instantiate redundant versions of pipeline components to enhance pipeline throughput.

13. A computational method supporting uninterrupted processing of incoming data notwithstanding temporary unavailability of one or more software components, the method comprising the steps of:
   a. allocating, in a computer memory, an address space comprising a bounded range of valid available addresses; and
   b. computationally executing a plurality modules arranged in at least one ordered, sequential computation pipeline and cooperating to process the incoming data, the modules including a primary component for receiving or generating data, at least one intermediate component for processing data received from a preceding component, and a terminal component for receiving data from a final intermediate component and sending outgoing data to a data sink, wherein each of the components except the terminal component is configured to communicate, to at least one subsequent pipeline component via the address space, a handoff comprising state information of the component producing the handoff and data for processing by at least one subsequent component, the handoffs being persistent in memory so that processing can resume following an interruption without loss of data or state along the at least one pipeline.

14. The method of claim 13, wherein each component performs a single idempotent step of a computing task.

15. The method of claim 13, wherein the primary component receives data from a continuous source and transfers the received data, without processing, into a handoff stored in the address space.

16. The method of claim 13, further comprising the step of persistently storing handoffs as memory-mapped files.

17. The method of claim 13, wherein at least some of the components receive input from more than one handoff and at least some of the components provide output to more than one handoff.

18. The method of claim 13, wherein each component causes removal of the state in the handoff received by that component following completion of a task.

19. The method of claim 13, wherein each component removes data from the handoff received by that component as it performs a task.

20. The method of claim 13, wherein the plurality of computational modules cooperate to detect a computational threat and cause a computational action to be taken to mitigate the threat.

21. The method of claim 13, further comprising coordinating updates to the pipeline components without loss of data or state by (a) pausing incoming data or (b) allowing data to continue to enter an incoming handoff of a pipeline component to be updated, causing the update to be installed and the updated pipeline component to be re-initialized, whereby the re-initialized updated pipeline component reads its starting state and data from the incoming handoff and no incoming data is lost.

22. The method of claim 13, further comprising coordinating replacement of a pipeline component without loss of data or state by (a) pausing incoming data or (b) allowing data to continue to enter an incoming handoff of the pipeline component to be updated, causing initialization of a replacement pipeline component whereby the replacement pipeline component and the pipeline component to be replaced simultaneously read the same handoff, and stopping and unloading the pipeline component to be replaced whereby no incoming data is lost.

23. The method of claim 13, further comprising the steps of assembling the pipeline by (i) parsing a pipeline configuration, (ii) organizing components of the pipeline configuration into a dataflow engine to process incoming via intermediate and terminal components, loading the components into memory, and, via memory allocation, connecting handoffs among the components.

24. The method of claim 23, further comprising the step of instantiating redundant versions of pipeline components to enhance pipeline throughput.

25. A computational system configured to support uninterrupted processing of incoming data notwithstanding temporary unavailability of one or more software components, the system comprising:
   a. a processor;
   b. a computer memory including an address space comprising a bounded range of valid available addresses; and
   c. at least one pipeline consisting of a pair of computational modules executable by the processor and cooperating to process the incoming data, the modules consisting of a primary component for receiving or generating data and a terminal component for receiving data from the primary component and sending outgoing data to a data sink, wherein the primary component is configured to communicate, to the terminal component via the address space, a handoff comprising state information for processing by the terminal component, the handoffs being persistent in memory so that processing can resume following an interruption without loss of data or state along the at least one pipeline.

26. A computational method supporting uninterrupted processing of incoming data notwithstanding temporary unavailability of one or more software components, the method comprising the steps of:
   a. allocating, in a computer memory, an address space comprising a bounded range of valid available addresses; and
   b. computationally executing at least one pipeline consisting of a pair of computational modules, the modules consisting of a primary component for receiving or generating data and a terminal component for receiving data from a the primary component and sending outgoing data to a data sink, wherein the primary component is configured to communicate, to the terminal component via the address space, a handoff comprising state information for processing by the terminal component, the handoffs being persistent in memory so that processing can resume following an interruption without loss of data or state along the at least one pipeline.

* * * * *